United States Patent
Mori et al.

(10) Patent No.: US 7,053,143 B2
(45) Date of Patent: May 30, 2006

(54) POLYESTER-BASED RESIN COMPOSITION

(75) Inventors: Akira Mori, Kanagawa (JP); Koji Yamamoto, Kanagawa (JP)

(73) Assignee: Mitsubishi Gas Chemical Co., Inc., Tokyo (JP)

( * ) Notice: Subject to any disclaimer, the term of this patent is extended or adjusted under 35 U.S.C. 154(b) by 284 days.

(21) Appl. No.: 10/660,718

(22) Filed: Sep. 12, 2003

(65) Prior Publication Data
US 2004/0054053 A1    Mar. 18, 2004

(30) Foreign Application Priority Data
Sep. 17, 2002   (JP) .......................... 2002-270382

(51) Int. Cl.
C08K 3/20    (2006.01)
C08K 3/26    (2006.01)
C08K 3/32    (2006.01)

(52) U.S. Cl. .................. 524/409; 524/413; 524/414; 524/425; 524/436

(58) Field of Classification Search ............... 524/409, 524/413–414, 435–436, 425
See application file for complete search history.

(56) References Cited

U.S. PATENT DOCUMENTS 6,667,383 B1 *  12/2003  Fujimori et al. ............ 528/279
6,703,474 B1 *   3/2004  Fujimori et al. ............ 528/275
6,733,853 B1 *   5/2004  Takashima et al. ........ 428/35.7

FOREIGN PATENT DOCUMENTS

| | | |
|---|---|---|
| EP | 1 239 008 | 9/2002 |
| JP | 2001 234064 | 8/2001 |
| JP | 2001-234064 | * 8/2001 |

* cited by examiner

Primary Examiner—Peter Szekely
(74) Attorney, Agent, or Firm—Antonelli, Terry, Stout and Kraus, LLP.

(57) ABSTRACT

The polyester-based resin composition of the present invention comprises a polyamide resin, a polyester resin containing an antimony compound and a compound selected from the group consisting of inorganic acid salts and hydroxides of group-1 or -2 metals of the periodic table and transition metals. In the polyester-based resin composition, the phosphorus atom concentration, the antimony atom concentration, and the blending ratio of the inorganic acid salt or hydroxide to the phosphorus compound are regulated so as to satisfy the specific relationships to effectively prevent the darkening due to the deposition of antimony metal, thereby providing the polyester-based resin composition having excellent gas barrier properties and a good appearance with minimized darkening.

16 Claims, No Drawings

POLYESTER-BASED RESIN COMPOSITION

BACKGROUND OF THE INVENTION

1. Field of the Invention

The present invention relates to a resin composition comprising a polyamide resin and a polyester resin, and a shaped article and a packaging container made of the resin composition. More specifically, the present invention relates to a resin composition produced by melt-blending a specific polyamide resin containing a phosphorus compound, a polyester resin containing an antimony compound and at least one compound selected from the group consisting of inorganic acid salts and hydroxides of the group-1 and -2 metals of the periodic table and the transition metals, the resin composition improving the gas barrier properties which is insufficient in the conventional resin compositions comprising only a polyester resin and eliminating the problem of a darkened appearance in the conventional resin compositions. The present invention also relates to a shaped article and a packaging container made of such a resin composition.

2. Description of the Prior Art

A polyester resin represented by a polymer, such as poly(ethylene terephthalate), which is prepared using an aromatic dicarboxylic acid and an aliphatic diol as monomers (hereinafter referred to as "polyester resin") has been now widely used as packaging materials such as films, sheets and hollow containers because of its excellency in clearness, mechanical properties, melt stability, solvent resistance, flavor retention, recycling ability, etc. In spite of such excellent properties, the application field of packaging containers made of a polyester resin is limited because the polyester resin is not always sufficient in gas barrier properties against oxygen, carbon dioxide, etc. Improvement of the gas barrier properties of polyester resin has been attempted by vapor-depositing aluminum oxide or silicon oxide onto a shaped article or packaging container made of a polyester resin, or by coating or laminating a resin having gas barrier properties higher than that of a polyester resin onto a shaped article or packaging container made of a polyester resin. However, since a complicated production process is required and the recycling ability or mechanical properties are detracted, the polyester resins improved by such methods have been used in limited fields.

As an alternative method for improving the gas barrier properties of polyester resin which is free from the above problems, cited is a melt blending of a thermoplastic resin having high gas barrier properties into a polyester resin. An ethylene-vinyl alcohol copolymer resin can be mentioned as an example for such a high gas barrier resin. However, the ethylene-vinyl alcohol copolymer resin is less compatible with a polyester resin because of its molecular structure to give a white cloudy resin composition when blended with a polyester resin, thereby spoiling the clearness that is one of the beneficial characteristics of a polyester resin. In addition, since the ethylene-vinyl alcohol copolymer resin is relatively high in crystallizability as compared with a polyester resin, the stretchability of polyester resin tends to be lowered, this making the resin blend inapplicable to the production of packaging containers such as oriented films and blown bottles because the production thereof inevitably requires a stretching process. Further, the ethylene-vinyl alcohol copolymer resin is susceptible to a rapid thermal degradation at an optimum temperature for processing a polyester resin. Thus, the blend of the ethylene-vinyl alcohol copolymer resin raises another problem of reducing the processing stability of polyester resin.

Gas barrier resins other than the ethylene-vinyl alcohol copolymer include polyamide resins represented by Nylon 6, Nylon 66, etc. Of the polyamide resins, poly(m-xylylene diadipamide) prepared by the polymerization of a diamine component mainly comprising m-xylylene diamine and a dicarboxylic acid component mainly comprising adipic acid is particularly excellent in the gas barrier properties. In addition to its high gas barrier properties as compared with those of other polyamide resins, poly(m-xylylene diadipamide) does not detract the processing stability of polyester resin because its glass transition temperature, melting point and crystallizability are close to those of a poly(ethylene terephthalate) which is a typical polyester resin currently being widely used. Therefore, poly(m-xylylene diadipamide) is quite suitable for improving the gas barrier properties of polyester resin. A commercially available poly(m-xylylene diadipamide), for example, MX Nylon (product name) of Mitsubishi Gas Chemical Company, Inc., may contain a phosphorus compound in an amount of several hundred ppm in terms of phosphorus atom to prevent the coloring of the resin during the melt processing.

The production of polyester resin is generally carried out in the presence of a metal catalyst containing germanium atom or antimony atom to increase the polymerization rate of monomers. It has been known in the art that a shaped article made of a polyester resin that is produced using an antimony-bearing catalyst is slightly darkened because of the deposition of metallic antimony by the reduction of an antimony compound. Therefore, to avoid the decrease of the commercial value of shaped article, the darkening is prevented by limiting the use amount of the antimony compound. Even in the case of using a limited amount of the antimony compound, if a shaped article is produced by melt-kneading and molding a polyester resin that is blended with poly(m-xylylene diadipamide) to improve the gas barrier properties, the darkening of the shaped article is considerably enhanced as compared with a shaped article from a polyester resin containing no poly(m-xylylene diadipamide), because the deposition of metallic antimony is promoted by a phosphorus compound in poly(m-xylylene diadipamide). Therefore, the commercial value is much reduced when the shaped article is used as packaging materials or packaging containers for foodstuffs, etc., where the appearance is of extreme importance.

Conventionally proposed is a hollow shaped article excellent in gas barrier properties which is made of a resin composition containing a thermoplastic polyester resin mainly constituted by ethylene terephthalate repeating units and a polyamide resin (for example, Japanese Patent Publication No. 4-54702). This document merely proposes to improve the gas barrier properties by incorporating a polyamide resin, and is quite silent as to the problem addressed in the present invention, i.e., the prevention of darkening of shaped articles by the action of phosphorus atom in a polyamide resin. Also proposed is a method of producing a heat-resistant synthetic resin bottle from a poly(ethylene terephthalate) resin blended with a nylon mainly constituted by m-xylylene diamine and adipic acid (for example, Japanese Patent Publication No. 6-78094). This document relates to the improvement of the production method of heat-resistant bottles, and there is nothing about the prevention of darkening of shaped articles by the action of phosphorus atom in a polyamide resin.

SUMMARY OF THE INVENTION

A first object of the present invention is to solve the above problems and provide a resin composition excellent in gas barrier properties and reduced in the darkening, which comprises a polyester resin prepared using an antimony compound as a catalyst and a specific polyamide resin containing a phosphorus compound. Another object of the present invention is to provide a shaped article and a packaging container made of such a resin composition.

As a result of study in view of solving the above problems, the inventors have found that the presence of an inorganic acid salt or a hydroxide of a group-1 or -2 metal of the periodic table or a transition metal in a specific proportion to the phosphorus compound in the polyamide resin deactivates the phosphorus atom to reduce the darkening of the polyester resin prepared by using an antimony compound as a catalyst caused by blending the polyamide resin, thereby providing a polyester resin-based resin composition excellent in gas barrier properties and reduced in the darkening. The present invention has been accomplished on the basis of this finding.

Thus, the present invention relates to a polyester-based resin composition which shows a lightness of 42 or more when made into pellets, the polyester-based resin composition being prepared by melt-blending:

a polyamide resin (A) containing a phosphorus compound, which is produced by the polycondensation of a diamine component comprising 70 mol % or more of m-xylylenediamine and a dicarboxylic acid component comprising 70 mol % or more of adipic acid;

a polyester resin (B) containing 50 to 400 ppm of an antimony compound on the basis of antimony atom; and at least one compound (C) selected from the group consisting of inorganic acid salts and hydroxides of group-1 or -2 metals of the periodic table and transition metals;

and satisfying the following expressions (1) and (2):

$$P1 \times (M1/100) \times B1 \times (M2/100) \geq 450 \quad (1)$$

$$C2/P2 \geq 1 \quad (2)$$

wherein:

M1 is a concentration of the polyamide resin (A) based on a total of the polyamide resin (A) and the polyester resin (B), ranging from 3 to 40% by mass;

M2 is a concentration of the polyester resin (B) based on the total of the polyamide resin (A) and the polyester resin (B), ranging from 60 to 97% by mass;

P1 is a phosphorus atom concentration (ppm) in the polyamide resin (A);

B1 is an antimony atom concentration (ppm) in the polyester resin (B);

P2 is a molar amount (mol) of the phosphorus compound in the polyamide resin (A); and C2 is a molar amount (mol) of the compound (C).

In the present invention, ppm is expressed on the basis of mass.

The present invention further relates to a shaped article and a packaging container made of the polyester-based resin composition.

DETAILED DESCRIPTION OF THE INVENTION

The present invention will be described below in more detail. The polyester resin (B) is prepared by polycondensing a dicarboxylic acid component mainly comprising an aromatic dicarboxylic acid and a diol component mainly comprising an aliphatic diol.

Examples of the aromatic dicarboxylic acid for the dicarboxylic acid component of the polyester (B) include benzenedicarboxylic acids such as terephthalic acid and isophthalic acid; naphthalenedicarboxylic acids such as 2,6-naphthalenedicarboxylic acid, 1,5-naphthalenedicarboxylic acid and 2,7-naphthalenedicarboxylic acid; biphenyldicarboxylic acids such as 4,4'-biphenyldicarboxylic acid and 3,4'-biphenyldicarboxylic acid; and ester-forming derivatives of the preceding dicarboxylic acids, with terephthalic acid, isophthalic acid, 2,6-naphthalenedicarboxylic acid and 4,4'-biphenyldicarboxylic acid being preferred. The proportion of the aromatic dicarboxylic acid is preferably 60 mol % or more (inclusive of 100 mol %), more preferably 70 mol % or more based on the total of the dicarboxylic acid component. When terephthalic acid is used, the proportion thereof in the dicarboxylic acid component is 70 mol % or more (inclusive of 100 mol %), preferably 80 mol % or more, and more preferably 90 mol % or more based on the total of the dicarboxylic acid component. When isophthalic acid is used in addition to terephthalic acid, the proportion of isophthalic acid is 1 to 10 mol %, preferably 1 to 8 mol %, and more preferably 1 to 6 mol % based on the total of the dicarboxylic acid component. The use of isophthalic acid in the proportion mentioned above lowers the crystallization speed of a resulting copolyester resin to improve the moldability. As another dicarboxylic acid component, usable in the production of the polyester resin (B) are aliphatic dicarboxylic acids such as adipic acid, azelaic acid and sebacic acid; monocarboxylic acids such as benzoic acid, propionic acid and butyric acid; polybasic carboxylic acids such as trimellitic acid and pyromellitic acid; and carboxylic anhydrides such as trimellitic anhydride and pyromellitic anhydride. These acids may be used in an amount not adversely affecting the effect of the present invention.

Examples of the aliphatic diol for the diol component of the polyester resin (B) include ethylene glycol, 1,3-propylene glycol, 1,4-butandiol, 1,4-cyclohexane dimethanol, 1,6-hexanediol, and ester-forming derivatives of the preceding diols, with ethylene glycol being preferred. The proportion of the aliphatic diol in the diol component is 70 mol % or more (inclusive of 100 mol %), preferably 80 mol % or more, and more preferably 90 mol % or more. As another diol component, usable in the production of the polyester resin (B) are monohydric alcohols such as butyl alcohol, hexyl alcohol and octyl alcohol; polyhydric alcohols such as trimethylolpropane, glycerol and pentaerythritol; and diols having a cyclic acetal structure. These diols may be used in an amount not adversely affecting the effect of the present invention.

The polyester resin (B) may be produced by a known method such as a direct esterification method and an ester-exchanging method. The production of polyester resin is generally carried out by using a polycondensation catalyst, for example, an antimony compound such as antimony trioxide and antimony pentoxide and a germanium compound such as germanium oxide. The effect of the present invention to reduce the darkening of the polyester-based resin composition and a shaped article and packaging container made thereof is applicable to a polyester resin prepared by using an antimony compound as a catalyst.

The concentration of the antimony compound used as the catalyst for preparing the polyester resin (B) is, in terms of antimony atom, 50 to 400 ppm, preferably 70 to 350 ppm, and more preferably 100 to 300 ppm based on the polyester resin (B). When the antimony concentration (concentration in terms of antimony atom) is 50 ppm or more, the polycondensation for preparing a polyester resin proceeds quickly to prevent the production of by-product and shorten the reaction time, this making the process industrially quite advantageous. When the antimony concentration is 400 ppm or less, the deposition of metallic antimony due to the reduction of antimony compound is prevented, namely, the darkening of the polyester resin is prevented to enhance the commercial value of shaped articles which are produced by such a polyester resin.

Polyester resins preferably used in the present invention may include poly(ethylene terephthalate) resin, poly(ethylene terephthalate-isophthalate) copolymer resin, poly(ethylene-1,4-cyclohexanedimethylene terephthalate) copolymer resin, poly(ethylene 2,6-naphthalenedicarboxylate) resin, poly(ethylene 2,6-naphthalenedicarboxylate-terephthalate) copolymer resin, and poly(ethylene terephthalate-4,4'-biphenyldicarboxylate) copolymer resin, with poly(ethylene terephthalate) resin and poly(ethylene terephthalate-isophthalate) copolymer resin being particularly preferred.

Prior to molding or forming, it is preferred to dry the polyester resin (B) so as to have a moisture content of 200 ppm or less, preferably 100 ppm or less, and more preferably 50 ppm or less. The intrinsic viscosity of the polyester resin (B) is not particularly limited, and preferably 0.5 to 2.0 dl/g, more preferably 0.6 to 1.8 dl/g when measured in a phenol/1,1,2,2-tetrachloroethane (60/40 by mass) mixed solvent at 25° C. A polyester resin having an intrinsic viscosity of 0.5 dl/g or more has a sufficiently high molecular weight. Therefore, a shaped article or a packaging container made of a polyester-based resin composition containing such a polyester exhibits sufficient mechanical properties required for structured bodies.

The polyamide resin (A) is a polyamide prepared by the polymerization of a diamine component containing 70 mol % or more (inclusive of 100 mol %) of m-xylylene diamine and a dicarboxylic acid component containing 70 mol % or more (inclusive of 100 mol %) of adipic acid. Preferably, the polyamide resin (A) is constituted by 90 mol % or more of m-xylylene diamine-adipic acid repeating units. A polyamide having the above monomer composition and the above structural unit is advantageous, because it is similar to a polyester resin such as poly(ethylene terephthalate) in the processing characteristics thereby not to impair the processing characteristics of the polyester-based resin composition.

The diamine component constituting the polyamide resin (A) is required to contain 70 mol % or more, preferably 90 mol % or more of m-xylylene diamine. A polyamide resin produced from a diamine component containing 70 mol % or more of m-xylylene diamine shows excellent gas barrier properties. Examples of the diamine other than m-xylylene diamine include, but not limited to, p-xylylene diamine, 1,3-bis(aminomethyl)cyclohexane, 1,4-bis(aminomethyl)cyclohexane, tetramethylene diamine, hexamethylene diamine, nonamethylnene diamine, and 2-methyl-1,5-pentane diamine.

The dicarboxylic acid component constituting the polyamide resin (A) is required to contain 70 mol % or more, preferably 90 mol % of more of adipic acid. When the dicarboxylic acid component contains 70 mol % or more of adipic acid, the decrease of gas barrier properties and the excessive decrease of crystallizability can be avoided. Examples of the dicarboxylic acid component other than adipic acid include, but not limited to, suberic acid, azelaic acid, sebacic acid, 1,10-decanedicarboxylic acid, terephthalic acid, isophthalic acid and 2,6-naphthalenedicarboxylic acid. In addition, a small amount of a monoamine or a monocarboxylic acid may be added as a molecular weight modifier during the polycondensation for producing the polyamide resin (A).

The polyamide resin (A) is prepared by a melt polycondensation method. For example, a nylon salt of m-xylylene diamine and adipic acid is heated under pressure in the presence of water to melt-polymerize m-xylylene diamine and adipic acid in molten state while removing water initially added and condensation water being produced. Alternatively, the polycondensation is carried out under ordinary pressure by directly adding m-xylylene diamine to a molten adipic acid. In this method, the polycondensation is carried out by continuously adding m-xylylene diamine to adipic acid to maintain the reaction system uniform liquid state while heating the reaction system so as to avoid the reaction temperature from being lowered below the melting point of oligoamide or polyamide being produced.

The polyamide resin (A) usually contains a phosphorus compound which is used to enhance the processing stability during the melt molding or prevent the coloring of the polyamide resin. The phosphorus compound preferably contains a group-1 or -2 metal of the periodic table or a transition metal. Examples thereof include phosphates, hypophosphites and phosphites of group-1 and -2 metals of the periodic table and transition metals. As the polyamide resin (A) used in the present invention, a polyamide prepared using a hypophosphite of an alkali metal or an alkaline earth metal is preferably used because of its excellent effect on preventing the coloring of polyamide. For attaining a sufficient effect on preventing the coloring, the concentration of the phosphorus compound in the production of the polyamide resin is 150 to 10000 ppm in terms of phosphorus atom based on the polyamide resin.

The relative viscosity of the polyamide resin (A) is preferably 1.83 to 4.20, more preferably 2.02 to 4.20, and still more preferably 2.30 to 4.20 when measured at 25° C. as a solution prepared by dissolving 1 g of polyamide resin in 100 ml of a 96% sulfuric acid. If the relative viscosity is 1.83 or less, uneven melting caused by instable fluidity of a molten resin becomes remarkable during the molding process of a polyester-based resin composition, thereby decreasing the commercial value of a shaped article and a packaging container. Since the relative viscosity of the polyamide resin (A) is 1.83 or more, the polyester-based resin composition of the present invention is extremely improved in its moldability.

Prior to molding or forming, it is preferred to dry the polyamide resin (A) so as to have a moisture content of 0.10% by mass or less, preferably 0.08% by mass or less, and more preferably 0.05% by mass or less. The drying operation may be carried out by a known method, for example, by a method where a polyamide resin is melt-extruded from a vented extruder while evacuating a cylinder by a vacuum pump to remove the moisture or by a method where a polyamide resin is dried by heating in a tumbler (rotary vacuum drum) at a temperature lower than its melting point under reduced pressure, although not limited thereto.

The compound (C) selected from the group consisting of inorganic acid salts and hydroxides of group-1 or -2 metals of the periodic table and transition metals is not specifically limited as far as it is reactive to the phosphorus compound contained in the polyamide resin (A). Since hypophosphites of alkali metal or alkaline earth metal are mainly used as the phosphorus compound, the compound (C) is preferably a basic inorganic acid salt or hydroxide containing at least one metal element selected from the group consisting of group-1 and -2 metals of the periodic table and transition metals. More preferably, the compound (C) is a basic inorganic acid salt or hydroxide having a pKb of 4.5 or more (inclusive of 14.0). Examples thereof include sodium hydroxide, potassium hydroxide, calcium hydroxide, barium hydroxide, magnesium hydroxide, sodium carbonate, potassium carbonate, barium carbonate, calcium carbonate, magnesium carbonate, sodium acetate, potassium acetate, calcium acetate, and barium acetate, although not limited thereto. These compounds (C) may be used alone or in combination of two or more.

The polyester-based resin composition is prepared by melt-blending the polyamide resin (A), the polyester resin (B) that is so controlled as to contain the antimony compound in a concentration of 50 to 400 ppm in terms of antimony atom, and the compound (C). The concentration of the polyamide resin (A) is preferably 3 to 40% by mass, more preferably 5 to 35% by mass of the total of the polyamide resin (A) and the polyester resin (B) in view of improving the gas barrier properties and stabilizing the moldability. The concentration of the polyester resin (B) is 60 to 97% by mass, preferably 65 to 95% by mass of the total of the polyamide resin (A) and the polyester resin (B).

In the present invention, the polyester-based resin composition satisfies the following expression (1):

$$P1 \times (M1/100) \times B1 \times (M2/100) \geq 450 \qquad (1)$$

wherein M1 is a concentration of the polyamide resin (A) based on a total of the polyamide resin (A) and the polyester resin (B), ranging from 3 to 40% by mass; M2 is a concentration of the polyester resin (B) based on the total of the polyamide resin (A) and the polyester resin (B), ranging from 60 to 97% by mass; P1 is a phosphorus atom concentration (ppm) in the polyamide resin (A); and B1 is an antimony atom concentration (ppm) in the polyester resin (B). Simultaneously, the polyester-based resin composition contains the compound (C) so as to satisfy the following expression (2):

$$C2/P2 \geq 1 \qquad (2)$$

wherein a molar amount (mol) of the phosphorus compound in the polyamide resin (A); and a molar amount (mol) of the compound (C). By satisfying the above requirements, the darkening due to the deposition of antimony metal can be prevented to provided a polyester-based resin composition excellent in gas barrier properties.

In the expression (1), $P1 \times (M1/100)$ and $B1 \times (M2/100)$ respectively mean the phosphorus atom concentration (ppm) and the antimony atom concentration (ppm) in the total of the polyamide resin (A) and the polyester resin (B). The upper limit of $P1 \times (M1/100) \times B1 \times (M2/100)$ is preferably 8000, and the upper limit of C2/P2 is preferably 50.

The polyester-based resin composition of the present invention has a lightness of 42 or more (inclusive of 100) when made into pellets. A lightness less than 42 indicate a significant occurrence of the darkening due to the blend of the polyamide resin (A), thereby unfavorably providing a shaped article and a packaging container having a darkened appearance.

The lightness referred to herein is a lightness (L value) measured by a reflection method according to JIS K7105 on pellets having a size of passing through 7 mesh but not passing through 12 mesh. The smaller the lightness, the darkening is more significant.

The polyester-based resin composition of the present invention may further contain another resin in an amount not adversely affecting the effect of the present invention. Examples of the additional resin include other polyester resins such as poly(ethylene naphthalate) and poly(butylene terephthalate); other polyamide resins such as nylon 6 and nylon 66; and a polyolefin such as polyethylene and polypropylene. In addition, a recycled resin of polyester resin, polyamide resin, a mixture thereof or a melt blend thereof may be blended in an amount not adversely affecting the effect of the present invention. Additives known in the art may be also blended, which may be pigment, dye, lubricant, delustering agent, heat stabilizer, weathering agent, UV absorber, nucleating agent, plasticizer, fire retardant, antistatic agent, layered silicate, organic or inorganic salt of cobalt, manganese or zinc, inhibitor of gelation of polyamide resin, etc.

The polyester-based resin composition may be produced by a method known in the polymer art. For example, the polyamide resin (A), the polyester resin (B) and the compound (C) are dry-blended in a tumbler, a V-type blender, a Herschel mixer, etc., and then melt-blended once or more in a single screw extruder, a twin screw extruder, a kneader, etc., thereby preparing the melt blend. If desired, the melt blend prepared in the above manner may be solid-phase polymerized.

The shaped article or the packaging container of the present invention may be produced from the polyester-based resin composition thus prepared by using an injection molding machine, a sheet-forming machine, a film-forming machine, etc. Alternatively, the shaped article or the packaging container can be produced directly from a dry blend of the polyamide resin (A), the polyester resin (B) and the compound (C) by using the machines mentioned above without subjected to a step for preparing the melt blend. It should be noted that the polyester-based resin composition (D) and the shaped article and packaging container made thereof can be produced by other methods known in the art without limited to those mentioned above.

The blending temperature for preparing the polyester-based resin composition and the molding temperature for producing the shaped article and the packaging container are not specifically limited as far as the temperature is higher than the melting temperatures of the polyamide resin (A) and the polyester resin (B), and simultaneously, the temperature allows the shaped article and the packaging container to have sufficiently high mechanical properties. For example, the blending temperature or the molding temperature is 240 to 310° C., preferably 260 to 300° C., and more preferably 270 to 290° C.

The shaped article or packaging container of the present invention has at least one layer made of the polyester-based resin composition. The shaped article and packaging container may include a film; a packaging bag or cap made of the film; a sheet; a cup, tray, bottle or tube made of the sheet; etc. The wall of the shaped article and packaging container may be a single layer of the polyester-based resin composition or a multi-layered structure laminated with another resin layer.

Examples of the multi-layered shaped article or packaging container include a bottle made of a multi-layered laminate comprising alternately stacked poly(ethylene terephthalate) layers and polyester-based resin composition layers; a sheet having a multi-laminated structure comprising, from the inner side, polyolefin (such as polyethylene and polypropylene) layer/adhesive polyolefin layer/polyester-based resin composition layer/adhesive polyolefin layer/polyolefin, and packaging containers such as tray and cup made of the sheet; and a film having a multi-layered structure comprising polyolefin layer/adhesive resin layer/polyester-based resin composition layer, and packaging bags made of the film. The polyester-based resin composition of the present invention can be applied to shaped articles and packaging containers having other multi-layered structures without limited to the above specific examples.

The shaped article and the packaging container made of the polyester-based resin composition show, because the highly gas barrier polyamide resin (A) is blended, gas barrier properties higher than those of a shaped article made only of the polyester resin (B), thereby enhancing the preservation quality of products being stored therein. To provide the shaped article and the packaging container with sufficient gas barrier properties, the thickness of the layer made of the polyester-based resin composition is preferably 0.003 to 5 mm, and more preferably 0.01 to 4.5 mm. By regulating the thickness of the layer made of the polyester-based resin composition within the above range, the shaped article and the packaging container acquire sufficient gas barrier properties.

A marked effect of the polyester-based resin composition of the present invention is obtained when it is molded into a shaped article such as bottle which has a portion, for example, a bottom portion and a mouthpiece portion, having a thickness of 2 mm or more. If a shaped article such as bottle is molded from a resin material with a remarkable darkening due to the deposition of antimony, the thick portion such as the bottom portion and the mouthpiece portion presents a darkened appearance, this drastically reducing the commercial value. In contrast, in the shaped article molded from the polyester-based resin composition of the present invention, the gas barrier properties can be improved, and simultaneously, the darkening of thick portion can be avoided, thereby enhancing the commercial value of the shaped article.

A relatively thin shaped article such as film made of the polyester-based resin composition is wound-up to a roll for distribution before made into packaging containers. Therefore, if produced from a resin material not reduced in its darkening, the wound-up roll presents a darkened appearance to greatly reduce their commercial value. In contrast, since the darkening is significantly reduced in the polyester-based resin composition of the present invention, the appearance of the wound-up roll presents substantially no darkening. Thus, the commercial value of shaped article and packaging container is greatly enhanced by the present invention.

Polyester resin compositions such as poly(ethylene terephthalate) have recently come to be recycled. In the recycling process of the polyester-based resin composition of the present invention, the filter clog can be minimized without limiting the type of polyester resin to be used to a specific one, because the deposition of metals can be prevented. Thus, the present invention is excellent in the recyclability.

The shaped article and the packaging container of the present invention are excellent in gas barrier properties and highly clear in its appearance with little darkening, and therefore, are suitable for preserving liquid foodstuffs, high moisture foodstuffs and low moisture foodstuffs. The liquid foodstuffs may include beverages such as carbonated drink, juice, water, milk, Japanese sake, whisky, Japanese spirits, coffee, tea, jelly drink, and health drink; seasonings such as flavoring liquid, Worcester sauce, soybean sauce, dressing, liquid stock, mayonnaise, soybean paste, and grated spice; paste foodstuffs such as jam, cream, and chocolate paste; and liquid processed foodstuffs such as liquid soup, boiled meat and vegetable, pickles, and stew. The high moisture foodstuffs may include fresh or boiled noodles such as wheat noodle and ramen noodle; non-cooked rice such as polished rice, moisture-controlled rice and washing-free rice; cooked rice; processed rice such as cooked rice with various ingredients, cooked rice with red beans, and rice gruel; and seasoning powders such as soup powder and stock powder. The low moisture foodstuffs may include dried vegetables, coffee beans, coffee powders, tea leaves, and cookies made of grains. In addition, the shaped article and the packaging container of the present invention are suitable for preserving solid or liquid chemicals such as herbicide and pesticide, liquid or paste medicines, cosmetic lotions, cosmetic creams, cosmetic milky lotions, cosmetic hair stuffs, hairdyes, shampoos, soaps, detergents, etc.

The present invention will be described in further detail by way of the following examples which should not be construed to limit the scope of the present invention. In the following examples and comparative examples, the evaluations were carried out by the following methods.

Evaluation Methods (1) Relative Viscosity

Into 100 ml of a 96% sulfuric acid, 1 g of an accurately weighed polyamide was dissolved under stirring at 20 to 30° C. Immediately after completely dissolved, 5 ml of the solution was put into a Cannon-Fenske viscometer and allowed to stand in a thermostat at 25° C. for 10 min, and then the falling speed (t) was measured. Separately, the falling speed (to) of the 96% sulfuric acid was measured in the same manner. The relative viscosity was calculated from the following equation:

Relative Viscosity=$t/t_0$.

(2) Moisture Content (% by Mass)

The amount of water was determined by using a Karl Fischer trace water microanalizer (CA-05 model) and a vaporizer (VA-05 model) available from Mitsubishi Chemical Corporation under vaporizing conditions of heating at the melting point for 30 min. The moisture content was calculated from the result.

(3) Antimony Atom Concentration

A polyester resin sample was wet-ashed in a wet ashing apparatus using sulfuric acid or nitric acid. The antimony atom content in the ashed sample was determined by an atomic absorption spectrometry. The antimony atom concentration of the polyester resin was calculated from the result.

(4) Lightness

As a measure for evaluating the extent of darkening of a shaped article and a packaging container, the lightness (L value) was measured by a reflection method according to JIS K7105 using a color difference meter (Z-II Optical Sensor) available from Nippon Denshoku Kogyo Co., Ltd. on pellets which were obtained by extruding the polyester-based resin composition from a twin screw kneading extruder, pelletizing and sifting the pellets to have a size of passing through 7 mesh but not passing through 12 mesh. Smaller the lightness, larger the extent of darkening.

(5) Oxygen Permeability

The oxygen permeability was measured on stretched films according to ASTM D3985 using OX-TRAN 10/50A manufactured by Modern Controls Co., Ltd. under the conditions of 23° C. and 60% relative humidity.

EXAMPLE 1

A polyamide MXD6 (hereinafter referred to as "PA1"; water content: 0.03% by mass; relative viscosity: 2.79; phosphorus concentration: 325 ppm) prepared by the polymerization of adipic acid and m-xylylene diamine using sodium hypophosphite, and poly(ethylene terephthalate) dry pellets (hereinafter referred to as "PET1"; available from MPI Polyester Industry Co., Ltd. under GS080A grade; antimony concentration: 230 ppm) were weighed in a blend ratio of 20/80 (PA1/PET1 by mass), to which calcium hydroxide (available from Wako Pure Chemical Industries, Ltd.; guaranteed grade; 96% purity) was added in an amount of 1000 ppm based on the total of PA1 and PET1, and blended in a tumbler.

The blend was extruded from a twin-screw kneading extruder (TEM37BS available from Toshiba Machine Co. Ltd.) under conditions of 270 to 280° C. cylinder temperature, 100 rpm screw speed and 15 kg/h extrusion speed under reduced pressure evacuating from a vent by a vacuum pump, and then pelletized by a pelletizer (SCF-150 available from Isuzu Kakoki Co., Ltd.). The lightness of the pellets is shown in Table 1.

The pellets were vacuum-dried by a vacuum dryer at 150° C. for 5 h, and then formed into a non-stretched film and an oriented film.

The non-stretched film was produced by an extruder (Laboplastomill available from Toyo Seiki Seisaku-Sho, Ltd.) equipped with a full flight screw and a T head at a cylinder temperature of 265 to 280° C. and a cooling roll temperature of 70° C.

The non-stretched film thus produced was subjected to a simultaneous biaxial stretching by a tenter method using a biaxial stretching machine (available from Toyo Seiki Seisaku-Sho, Ltd.) in a stretch ratio of 3.5×3.5 after preheating at 100° C. for 30 s, and then heat-set at 240° C. to obtain the oriented film.

The oxygen permeability constant of the stretched film is shown in Table 1.

EXAMPLE 2

The procedures of Example 1 were repeated except for changing the addition amount of calcium hydroxide to 311 ppm based on the total of the polyamide resin and the polyester resin to produce pellets and films. The lightness of the pellets and the oxygen permeability constant of the oriented film are shown in Table 2.

EXAMPLE 3

The procedures of Example 1 were repeated except for changing the addition amount of calcium hydroxide to 466 ppm based on the total of the polyamide resin and the polyester resin to produce pellets and films. The lightness of the pellets and the oxygen permeability constant of the oriented film are shown in Table 2.

COMPARATIVE EXAMPLE 1

In the same manner as in Example 1 except for omitting the addition of calcium hydroxide, pellets and films were produced. The lightness of the pellets and the oxygen permeability constant of the stretched film are shown in Table 1.

COMPARATIVE EXAMPLE 2

The procedures of Example 1 were repeated except for using sodium hydrogencarbonate (available from Wako Pure Chemical Industries, Ltd.; guaranteed grade; 96% purity) in place of calcium hydroxide in an amount of 1000 ppm based on the total of the polyamide resin and the polyester resin to produce pellets and films. The lightness of the pellets and the oxygen permeability constant of the stretched film are shown in Table 1.

COMPARATIVE EXAMPLE 3

The procedures of Example 1 were repeated except for changing the addition amount of calcium hydroxide to 156 ppm based on the total of the polyamide resin and the polyester resin to produce pellets and films. The lightness of the pellets and the oxygen permeability constant of the stretched film are shown in Table 2.

TABLE 1

|  | Example | Comparative Example | |
|---|---|---|---|
|  | 1 | 1 | 2 |
| Polyamide resin (PA1) | | | |
| Content (M1, mass %) | 20 | 20 | 20 |
| Concentration of phosphorus atom (P1, ppm) | 325 | 325 | 325 |
| Polyester resin (PET1) | | | |
| Content (M2, mass %) | 80 | 80 | 80 |
| Concentration of antimony atom (B1, ppm) | 230 | 230 | 230 |
| Compound (C) | | | |
| calcium hydroxide (ppm) | 1000 | 0 | 0 |
| sodium hydrogencarbonate (ppm) | 0 | 0 | 1000 |
| C2/P2 | 6.4 | 0 | 5.8 |
| Lightness of pellets | 53 | 28 | 32 |
| Appearance of pellets | no darkening | darkened | darkened |
| Oxygen permeability constant of stretched film (cc · mm/m$^2$ · day · atm) | 0.27 | 0.27 | — |

TABLE 2

|  | Example | | Comparative Example |
|---|---|---|---|
|  | 2 | 3 | 3 |
| Polyamide resin (PA1) | | | |
| Content (M1, mass %) | 20 | 20 | 20 |
| Concentration of phosphorus atom (P1, ppm) | 325 | 325 | 325 |
| Polyester resin (PET1) | | | |
| Content (M2, mass %) | 80 | 80 | 80 |
| Concentration of antimony atom (B1, ppm) | 230 | 230 | 230 |
| Addition amount of alkali calcium hydroxide (ppm) | 311 | 466 | 148 |
| C2/P2 | 2.0 | 3.0 | 0.95 |
| Lightness of pellets | 43 | 54 | 39 |
| Appearance of pellets | no darkening | no darkening | darkened |
| Oxygen permeability constant of stretched film (cc · mm/m$^2$ · day · atm) | 0.28 | 0.28 | 0.27 |

As seen from the above examples, Examples 1 to 3 where the amount of the phosphorus compound in the polyamide resin and the amount of calcium hydroxide as the compound (C) satisfied the expression (2) showed gas barrier properties comparable to that of Comparative Example 1 where no compound (C) was added. However, in Examples 1 to 3, the darkening due to the deposition of antimony atom in the polyester resin was effectively prevented, thereby providing improved appearance with high commercial value.

In Comparative Example 3 where the amount of the phosphorus compound in the polyamide resin and the amount of calcium hydroxide as the compound (C) failed the expression (2), and Comparative Example 2 where sodium hydrogencarbonate was added in place of the compound (C), the appearance was deteriorated by the occurrence of darkening due to the deposition of antimony atom in the polyester resin.

The polyester-based resin composition of the present invention which is prepared by melt-blending the polyamide resin, the polyester resin and the compound (C), and the shaped article and the packaging container made therefrom are excellent in gas barrier properties and also excellent in external appearance because of the prevention of the darkening. Thus, the polyester-based resin composition of the present invention and the shaped article and the packaging container made therefrom have high commercial value and are industrially advantageous as compared with those which are conventionally known.

What is claimed is:

1. A polyester-based resin composition which shows a lightness of 42 or more when made into pellets, the polyester-based resin composition being prepared by melt-blending:
   a polyamide resin (A) containing a phosphorus compound, which is produced by the polycondensation of a diamine component comprising 70 mol % or more of m-xylylenediamine and a dicarboxylic acid component comprising 70 mol % or more of adipic acid;
   a polyester resin (B) containing 50 to 400 ppm of an antimony compound on the basis of antimony atom; and
   at least one compound (C) selected from the group consisting of inorganic acid salts and hydroxides of group-1 or -2 metals of the periodic table and transition metals; and satisfying the following expressions (1) and (2):

$$P1 \times (M1/100) \times B1 \times (M2/100) \geq 450 \quad (1)$$

$$C2/P2 \geq 1 \quad (2)$$

wherein:
   M1 is a concentration of the polyamide resin (A) based on a total of the polyamide resin (A) and the polyester resin (B), ranging from 3 to 40% by mass;
   M2 is a concentration of the polyester resin (B) based on the total of the polyamide resin (A) and the polyester resin (B), ranging from 60 to 97% by mass;
   P1 is a phosphorus atom concentration (ppm) in the polyamide resin (A);
   B1 is an antimony atom concentration (ppm) in the polyester resin (B);
   P2 is a molar amount (mol) of the phosphorus compound in the polyamide resin (A); and
   C2 is a molar amount (mol) of the compound (C).

2. The polyester-based resin composition according to claim 1, wherein the polyamide resin (A) is prepared by the polycondensation of a diamine component comprising 90 mol % or more of m-xylylenediamine and a dicarboxylic acid component comprising 90 mol % or more of adipic acid.

3. The polyester-based resin composition according to claim 1, wherein the phosphorus compound contained in the polyamide resin (A) is at least one salt selected from the group consisting of hypophosphites, phosphites and phosphates of group-1 and -2 metals of the periodic table and transition metals.

4. The polyester-based resin composition according to claim 1, wherein the polyester resin (B) is prepared by the polycondensation of a dicarboxylic acid component comprising 70 mol % or more of terephthalic acid and a diol component comprising 70 mol % or more of ethylene glycol.

5. The polyester-based resin composition according to claim 4, wherein the dicarboxylic acid component further comprises 1 to 10 mol % of isophthalic acid.

6. The polyester-based resin composition according to claim 1, wherein the compound (C) is a basic compound having a pKb of 4.5 or more.

7. The polyester-based resin composition according to claim 6, wherein the compound (C) is at least one compound selected from the group consisting of sodium hydroxide, potassium hydroxide, calcium hydroxide, barium hydroxide, magnesium hydroxide, sodium carbonate, potassium carbonate, barium carbonate, calcium carbonate, magnesium carbonate, sodium acetate, potassium acetate, calcium acetate, and barium acetate.

8. A shaped article having at least one layer which is made of a polyester-based resin composition as defined in claim 1.

9. The shaped article according to claim 8, wherein a thickness of the layer made of the polyester-based resin composition is 0.003 to 5 mm.

10. The shaped article according to claim 8, which is made into a form of film or sheet.

11. A packaging container which is molded from the polyester-based resin composition as defined in claim 1.

12. The packaging container according to claim 11, which is a hollow shaped article having a mouthpiece portion of 2 mm thick or more.

13. The packaging container according to claim 11, which is produced by injection-molding a polyester-based resin composition and then blow-molding.

14. The polyester-based resin composition according to claim 1, wherein the polyester resin (B) contains 100 to 300 ppm of the antimony compound on the basis of antimony atom.

15. The polyester-based resin composition according to claim 1, wherein the concentration of phosphorus compound is 150 to 10,000 ppm in terms of phosphorus atom based on the polyamide resin.

16. The polyester-based resin composition according to claim 1, which includes the polyamide resin (A) in an amount of 5 to 35% by mass, of the total of the polyamide resin (A) and the polyester resin (B).

* * * * *